(12) United States Patent
Earle

(10) Patent No.: US 8,629,677 B2
(45) Date of Patent: Jan. 14, 2014

(54) HYBRID INDUCTION BALANCE/PULSE INDUCTION METAL DETECTOR

(75) Inventor: John L. Earle, Sweet Home, OR (US)

(73) Assignee: White's Electronics, Inc., Sweet Home, OR (US)

(*) Notice: Subject to any disclaimer, the term of this patent is extended or adjusted under 35 U.S.C. 154(b) by 327 days.

(21) Appl. No.: 13/166,004

(22) Filed: Jun. 22, 2011

(65) Prior Publication Data

US 2011/0316541 A1 Dec. 29, 2011

Related U.S. Application Data

(60) Provisional application No. 61/398,298, filed on Jun. 23, 2010, provisional application No. 61/401,433, filed on Aug. 12, 2010.

(51) Int. Cl.
*G01V 3/10* (2006.01)
(52) U.S. Cl.
USPC .......................................... 324/326; 324/327
(58) Field of Classification Search
USPC ........................................................ 324/326
See application file for complete search history.

(56) References Cited

U.S. PATENT DOCUMENTS

| | | | | |
|---|---|---|---|---|
| 5,537,041 A * | 7/1996 | Candy | ............................ | 324/329 |
| 6,326,790 B1 * | 12/2001 | Ott et al. | ........................ | 324/327 |
| 6,452,396 B2 * | 9/2002 | Ott et al. | ........................ | 324/327 |
| 6,911,823 B2 * | 6/2005 | Rowan | ............................ | 324/326 |
| 7,414,404 B2 * | 8/2008 | Keene | .............................. | 324/329 |
| 7,649,356 B2 * | 1/2010 | Earle | ............................... | 324/326 |

OTHER PUBLICATIONS

Hershbach, Pulse induction vs Induction balance and multi-frequency, p. 1-3, www.voy.com/76600/7/475.html.*
Rerkratn, et al., System development for tube inspection based on eddy current technique, SICE Annual Conference 2012, Akita, Japan, p. 1-4.*

* cited by examiner

*Primary Examiner* — Thomas F Valone
(74) *Attorney, Agent, or Firm* — James Creighton Wray

(57) ABSTRACT

A new hybrid metal detector combines induction balance and pulse induction technologies. Target signals are generated from a transmitted wave that has both induction balance and pulse current inducing characteristics and uses pertinent sampling of the receive data. Combining the two data sources provides eddy current target identification while excluding ground permeability and remanence obscuration.

26 Claims, 10 Drawing Sheets

HYBRID INDUCTION BALANCE/PULSE INDUCTION METAL DETECTOR

This application claims the benefit of U.S. Provisional Applications 61/398,298, filed Jun. 23, 2010, and 61/401,433, filed Aug. 12, 2010, which are hereby incorporated by reference in their entireties.

BACKGROUND OF THE INVENTION

There are two basic types of metal detectors: induction balance and pulse induction as the industry has come to know these two types.

Induction balance (IB), which is a traditional metal detector, transmits (or induces) a varying current in the medium (ground) to be searched. Typically it was a sine wave, and then the induced current more recently became a combination of several frequencies, or derived frequencies from a square wave. In that type of detector, the ideal place to look for the target (coin) signal is when the transmit or inducing current is not changing since a changing current causes the ground mineral (iron or ferrite) to create a signal, often obscuring the desired target object.

In the pulse induction (PI) detector, typically there is no looking for the target until after the pulse has ended and the current has returned to zero, leaving only the decaying field current from the desired eddy current object.

The induction balance detector is very sensitive to target objects when the searching window is centered about an average point in the excitation curve where there is no change in current, although that may be at a peak current. But, small variations in the ground nature and in the excitation current can also create small, but undesired false signals.

Whereas, the traditional pulse induction detector has no excitation current during the interrogation window, so the largely ferrous response does not obscure the fading target signal, unless second order elements exist, such as remnant ground minerals that exhibit a diminishing permanent magnetism. But, the pulse detector requires a settling time after the current goes from a high value to zero, which means the interrogation for target is slightly delayed, obscuring the smaller targets with fast eddy current decay time.

Needs exist for improved metal detectors.

SUMMARY OF THE INVENTION

The new invention of a hybrid induction balance/pulse induction metal detector provides for both scenarios simultaneously. One enhances performance where the other is weak. Implementation can be done several ways.

The induction balance detector has a varying excitation waveform. The current wave passes through zero, which is essential because that is where the ground balance point is to eliminate ground minerals. All other minerals and coins, etc. are detected at that zero current point.

The pulse induction detector has a pulse in voltage, giving rise to a current wave that increases like a ramp and then suddenly crashes back to zero. The PI detector does its sampling or detection after the current wave has crashed back down to zero.

Without having totally separate driving hardware, the two can be combined several ways as follows:

Take a pulse induction current ramp detector and round off the peak, so it slowly curves back down before it crashes to zero, giving it a nice, smooth place to put an induction balance ground balance point. Pulse induction data is still there after the crash to zero.

Take a detector and suddenly interrupt the current just after the sine wave peak of current (where the ground balance point is), causing the current to crash to zero, giving pulse inductor data alter the crash to zero.

The latter provides complete switching of the transmit sources and actually combines a pulse induction and an induction balance detector. This is possible and gives the best possibility of having perfect induction balance results and perfect pulse induction results. But to the engineer, the combination seems unwieldy and cumbersome.

One normal difference between a pulse induction and an induction balance detector today is that the pulse induction is a mono polarity pulse, whereas the induction balance is a bi-polar wave. The bipolar induction balance wave is preferred because it gets rid of the Earth's magnetism and some interference.

U.S. Pat. No. 7,649,356 is hereby incorporated by reference in its entirety, as if fully set forth herein.

A pulse induction detector should and can also be a bipolar detector, but the hobbyist pulse induction industry has not gone bipolar.

A half sine detector in U.S. Pat. No. 7,649,356 with switching is modified to achieve interrupting the current after the zero current point of ground balance, but before the wave decreases very much so the pulse will have plenty of energy to crash to zero and form a true pulse induction detector is described. As in the previous patent, it is also a bipolar current wave, which is preferred over doing mono polarity pulse induction.

The metal detector detects conductive metals by detecting the target's modification to the induced field. Conductive metals exhibit a decaying eddy current signal as the inducing current dissipates. The biggest deterrent to finding conductive metals in a typical ground medium of magnetic ferrite type mineralization is the response from that mineralization whenever the inducing current is changing.

In the induction balance detector, the target receiving interrogation window is centered about an average time where current does not change. Elsewhere, where the current is changing, a large signal is induced in the receive coil, obscuring the desired eddy current target object, such as a coin.

Discrimination and phase angle determination is achieved by sampling for a second receive signal where there is considerable ground mineral signal where the inducing current is changing and the ground mineral signal is removed, or nearly removed, by low frequency filtering that attenuates the slowly changing ground mineralization signal, because the ground mineralization covers a large area, compared to the desired target object.

In the pulse induction detector, the exciting current is turned off abruptly, then there is a necessary settling time and then the remaining decaying target object eddy current signal is detected as the target.

Small variations in inducing current and in the ground mineral nature often gives rise to ground mineral signals that may obscure the desired target object in the induction balance detector, although it is otherwise sensitive to the smallest target object.

In the pulse induction detector, some time is needed for the current settling to return to zero, obscuring small targets. The ground mineralization effect is well removed.

This new hybrid metal detector invention combines both types of signals. Implementation can be achieved in several ways, with intent being to achieve an interrogation window of essentially no inducing current change while the inducing current is present and another interrogation window when the inducing current is not present.

Many other variations can be implemented for enhanced effects, such as generating a series of mono polarity half sines approximating a long average current energizing current during which the sine curve is not cut short, but returns to zero for maximum efficiency as the inductor capacitor resonance is more fully achieved.

Receive interrogation can be done on each consecutive half sine peak to observe targets with longer eddy current charging times.

The new metal detector combines both induction balance and pulse technology. The methodology uses a truncated half sine of exciting current to the energizing coil and an induction balanced receive coil. The half sine is created by a charged capacitor being switched on to the energizing inductor coil and then being switched off before the end of a half cycle of resonance.

Sampling the received signal at the peak of the transmit half sine of current provides a ground balanced receive signal responsive to the eddy current targets.

The half sine of transmit current continues to decline briefly after the ground nulling sampling is completed, and then current is switched off from the capacitor, concluding with a traditional pulse flyback and receive target response thereafter for the pulse data.

The mineralized ground has both permeability and remanence. The pulse data is flawed by the remanent signal from the ground minerals, but the permeability signal does not show up in the pulse response sampling.

The resulting half sine ground balanced signal is sampled to cancel the composite of both permeability and remanence for the detection and amplitude data in the induction balance channel.

Assuming that the permeability to remanence ratio is a slowly changing ratio, changing from one large area of investigation to another, it is possible to use the non-zero response from the induction balance portion of the half sine of current to get the intensity of ground permeability and the remanence. By receive sampling at exactly the peak of current, where there is no permeability signal in the induction balance signal, the remanence signal is detected and can be used to directly cancel the remanence from the pulsed decaying data. Various ratios can be established to provide for multiple receive samples of the pulse data with no ground response, which allows for excellent characterization of only the desired eddy current target object.

This can then be used to subtract from one or more samples in the pulse decay time to cancel the remanent portion from the pulse response, allowing for target identification in the pulse domain data.

U.S. Pat. No. 7,649,356, which is incorporated herein in its entirety, does not specify truncated half sine of current for the transmitted wave. Implementation is nearly identical, except for where in the current wave, the capacitor is switched off from the resonating inductor. The tradeoff of when to truncate the half sine is between the efficient full half sine with less small target excitation in the pulse mode following excitation and truncating earlier, closer to 90 degrees for a strong pulse detection response following excitation while losing the resonant efficiency of allowing the full half cycle to complete. A practical time of excitation is approximately 150 degrees to accommodate both modes of operation and reasonable efficiency.

These and further and other objects and features of the invention are apparent in the disclosure, which includes the above and ongoing written specification, with the claims and the drawings.

DETAILED DESCRIPTION OF THE DRAWINGS

Figure 1:
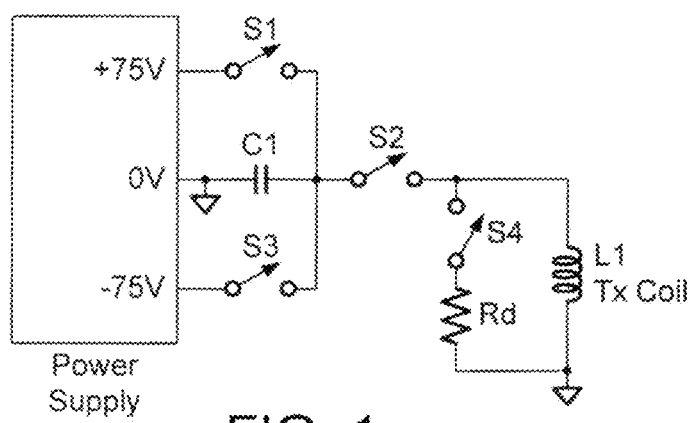
FIG. 1 is a block diagram of pertinent transmitting components.

For ease of understanding, times are shown in degrees. 10 degrees=about 4 microseconds. FIG. 1 is a block diagram of pertinent transmitting components.

Figure 2:
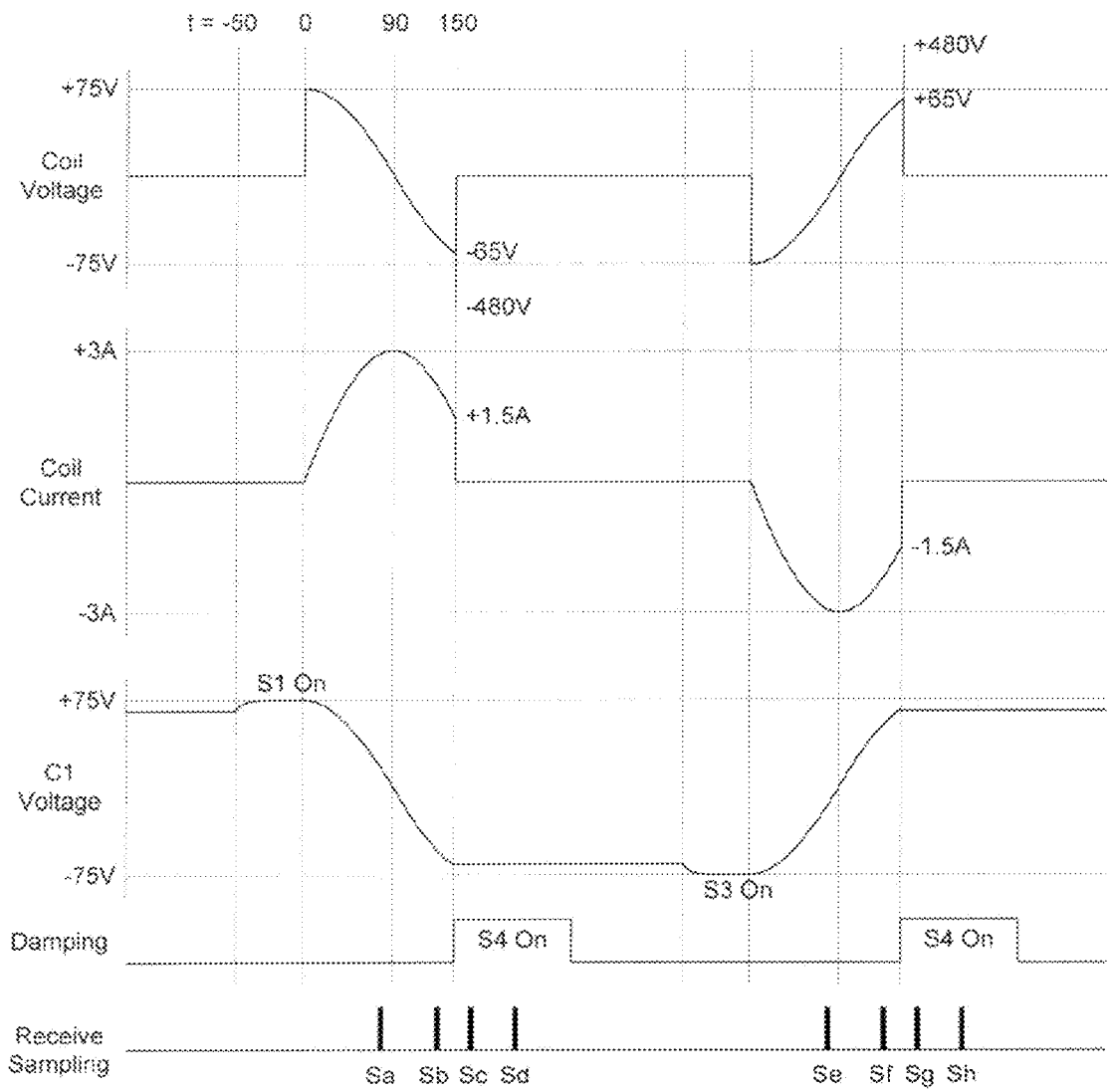
FIG. 2 shows the pertinent transmit wave forms, especially relative to the transmit inducing circuitry of FIG. 1.

FIG. 2 shows the pertinent transmit wave forms, especially relative to the transmit inducing circuitry of FIG. 1.

First, switch S1 closes at T−50, charging capacitor C1 to +75 volts. After capacitor C1 is charged Switch 1 opens at T=O. Switch 2 closes at T=0, causing current to flow into transmit coil L1. Capacitor C1 resonates with transmit coil L1, producing the voltage 11 and current 13 wave forms of FIG. 2. Voltage passes through zero at T=90 as current peaks. At T=150, switch S2 opens with current at ½ of the peak value, and voltage is charged to −65 volts from current flowing out of transmit coil L1 into capacitor C1. Switch S2 opens leaving capacitor C1 with the −65 volt charge. At T=400 switch switch S3 closes, charging capacitor C1 to a full −75 volts just before switch S2 turns on again at T=450. Resonance occurs again in the opposite polarity as similar waveforms are produced until switch S2 opens again at T=600.

The resonance mode of induction balance ends typically at 150 degrees, where the voltage is nearly as great as the initial charged capacitor voltage at 86.6%, yet the current is still at 50% of the peak current. This still results in a sizable flyback voltage, typically +/−480 volts at the peak, limited by zener-action of the switching field effect diode transistors. The area under the resonant curve is significantly greater than that of the traditional ramp of a classical pulse detector without resonant charging of the inductor.

Switch S4, the damping switch, turns off during the resonant portion of the current wave, and turns back on during the pulse detection period following the current wave. The resonant induction balance mode receive data is taken at Sa, Sb, Se and Sf sample points, and the pulse mode data is taken by receive sampling at sampling points Sc, Sd, Sg and Sh.

Resonant induction balance mode receives data at sampling points Sa and Sb are differentially added in a ratio that cancels ferrite response. Similarly, Se and Sf do the same, and they are differentially summed with Sa and Sb providing full wave detection to eliminate noise and single polarity responses, such as from the earth's magnetic field. While nulled for ferrite, these samples respond to desired eddy current target signals during the induction balance mode of metal detection.

Sampling points Sc and Sg provide early samples in the pulse mode of detection, responding to small eddy current targets and they are not responsive to ground permeability being in the pulse mode. The induction balance signals of sampling points Sa and Sb are summed with pulse signals of Sc and Sg with a variable ratio that cancels the remanent ground response. Thus, both permeability and remanent ground factors are cancelled out, while the desired eddy currents from targets add together, providing the desired target response.

Likewise, later pulse mode data samples at sampling points Sd and Sh provide similar responses for targets of longer time response. After removing permeability and remanent signals from these summations, differences in amplitude of early and late pulse signals can be used to discriminate or identify targets depending upon their decaying eddy current response time.

Reference to FIGS. 1 and 2 in one cycle, switch S1 is closed to charge—top off capacitor C1. Then switch S1 is opened and switch S2 is closed. After capacitor C1 reaches zero volts, it is partially negatively charged by transmit coil L1.

At truncation switch S2 is opened and switch S4 is closed for damping.

Induction balance samples are taken at maximum coil current and just before truncation.

Pulse induction samples are taken shortly after damping begins and later during damping. While transit coil L1 is at rest at zero volts capacitor C1 keeps its negative charge of about −65 volts.

After a delay switch S3 is closed to top off capacitor C1 at −75 V. Then switch S2 is closed and the process is reversed. When capacitor C1 and transit coil L1 pass through zero volts, transit coil L1 begins to charge capacitor C1 positively.

At truncation switch S2 is opened and switch S4 is closed for damping.

Induction balance samples are taken at maximum coil current and just before truncation.

Pulse induction samples are taken shortly after damping begins and during damping. While transit coil L1 is at rest at zero volts capacitor C1 keeps its positive charge of about +65 volts.

The whole cycle repeats after a delay that is about at least as long as the coil is active.

Figure 3:
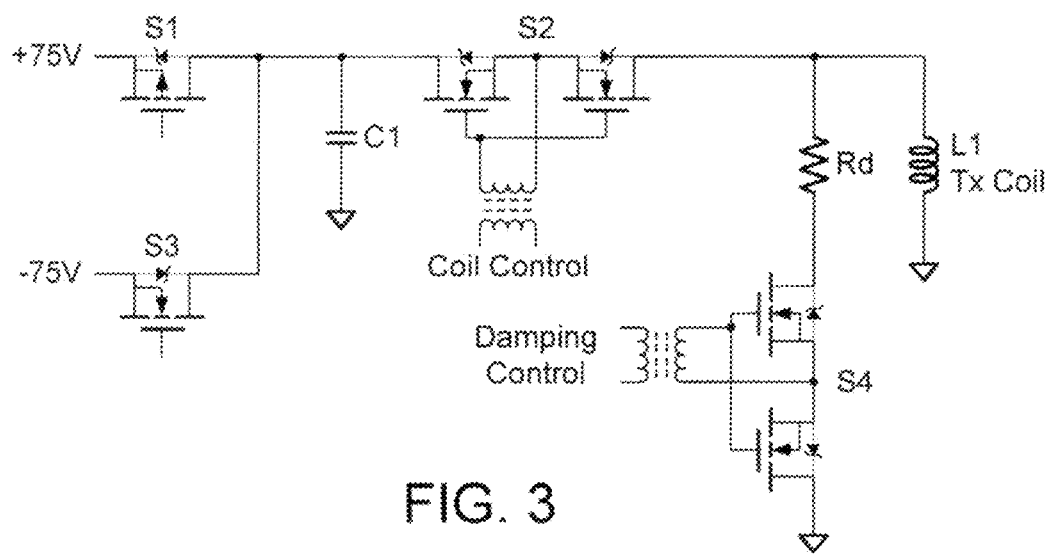
FIG. 3 shows the field effect transistor switch configuration for S1-S4, S1=P type, S2, 3 & 4=N type.

FIG. 3 shows control of the connections between the capacitor C1 and the transmit coil L1. Switches S1-S4 are field effect transistors. Switches S1 and S3 are single field effect transistors. Coil control switch S2 and damping control switch S4 are back-to-back double field effect transistors. All of the field effect transistors have incorporated zener diodes which control reverse current direction and threshold. Gates on switches S1 and S3 are controlled by cycle timers. Gates in switch S2 and switch S4 are controlled by coil control and damping control transformers.

Figure 4:
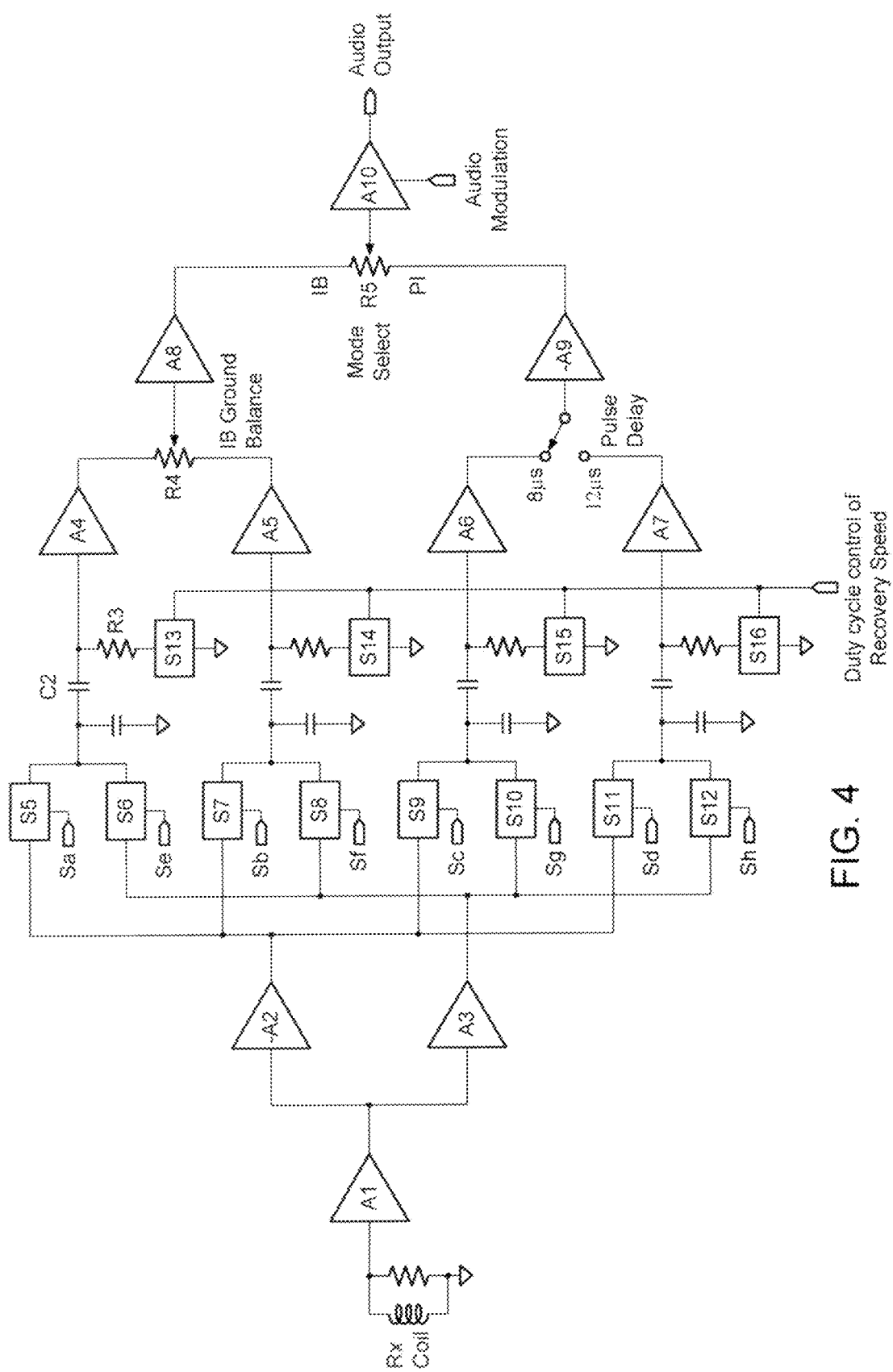
FIG. 4 illustrates the Receive data channels with equal adjustable high pass filtering on all channels with duty cycle switching of the resistive time constants.

FIG. 4 illustrates the Receive data channels with equal adjustable high pass filtering on all channels with duty cycle switching of the resistive time constants.

Amplifier A1 amplifies the receive coil L1 signal, then amplifiers A2 and A3 provide opposite polarities to the synchronous detection switches S5-S12. Residual DC from the synchronous detection/rectification is removed by capacitor C2, as an example for the first channel 101. Resistor R3 forms a time constant with capacitor C2, or a high pass filter to get rid of leakage current drift and to provide a form of motion filtering to remove traces of slowly changing ground signals that may not be totally removed by the ground balancing in potentiometer R4.

With switch S13 open, there is no DC return path for capacitor C2. But after several minutes, leakage currents will cause a drift. When switch S13 is closed, then a relatively short time constant of a fraction of a second is in the signal path. By varying the duty cycle of when switch S13 is on, this time constant becomes variable. All channels are driven by the same duty cycle, so the dynamics of all channels are equal. These are CMOS switches, with a slight charge injection during switching from on to off. To reduce this effect the frequency of the duty cycle modulation is kept as low as practical, typically 100 Hertz, which is just above the low pass noise filtering, not shown, at typically 30 Hz for the passing of the dynamic signal change as the search coil is swept over the ground containing the target object.

Amplifiers A4 and A5 provide opposite phase ground signals to potentiometer R4, which is adjusted for a ground null, while target signals are passed on through amplifier A8 to the mode selection potentiometer R5.

Any ratio of induction balance to pulse induction signals can be established with potentiometer R5. A mixture of both provides means of nulling the slight viscous magnetic remanence signal from the pulse signal from amplifier A9, by adjusting potentiometer R4 slightly off of the perfect ground nulling position for the induction balance only signal. When both induction balance and pulse induction channels are used, as in target identification, an additional potentiometer is used for the added channel where two channels are needed to determine the target identification ratio for each target object.

Potentiometer R4 can be replaced by electronic means that automatically adjusts the ground nulling.

Figure 5:
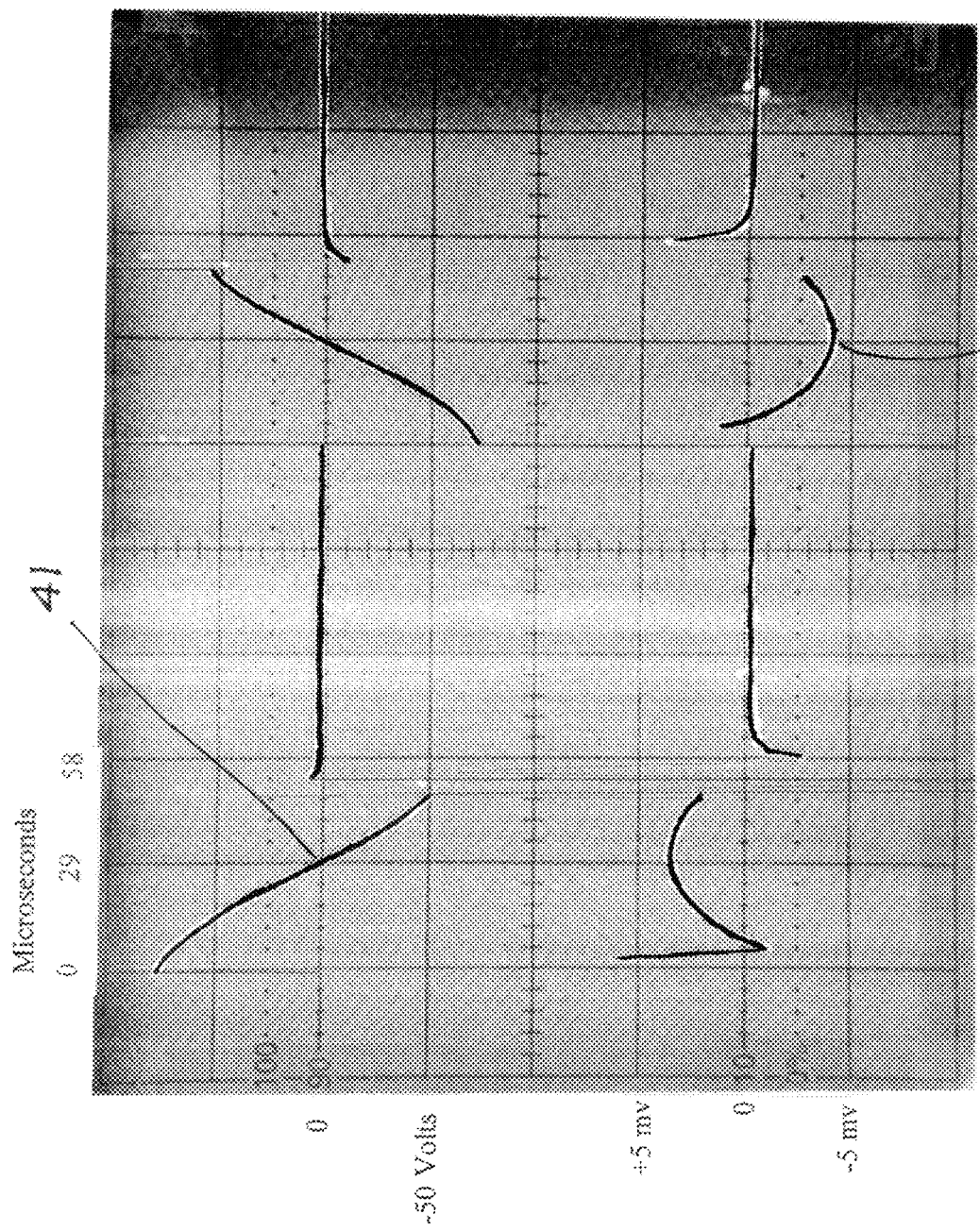
FIG. 5 shows typical transmit (Upper trace) and receive (Lower trace) voltage waveforms with no target or ground mineral (like ferrite) present, i.e., residual conditions.

FIG. 5 shows typical transmit 41 (Upper trace) and receive 51 (Lower trace) voltage waveforms with no target or ground mineral (like ferrite) present, i.e., residual conditions.

Figure 6:
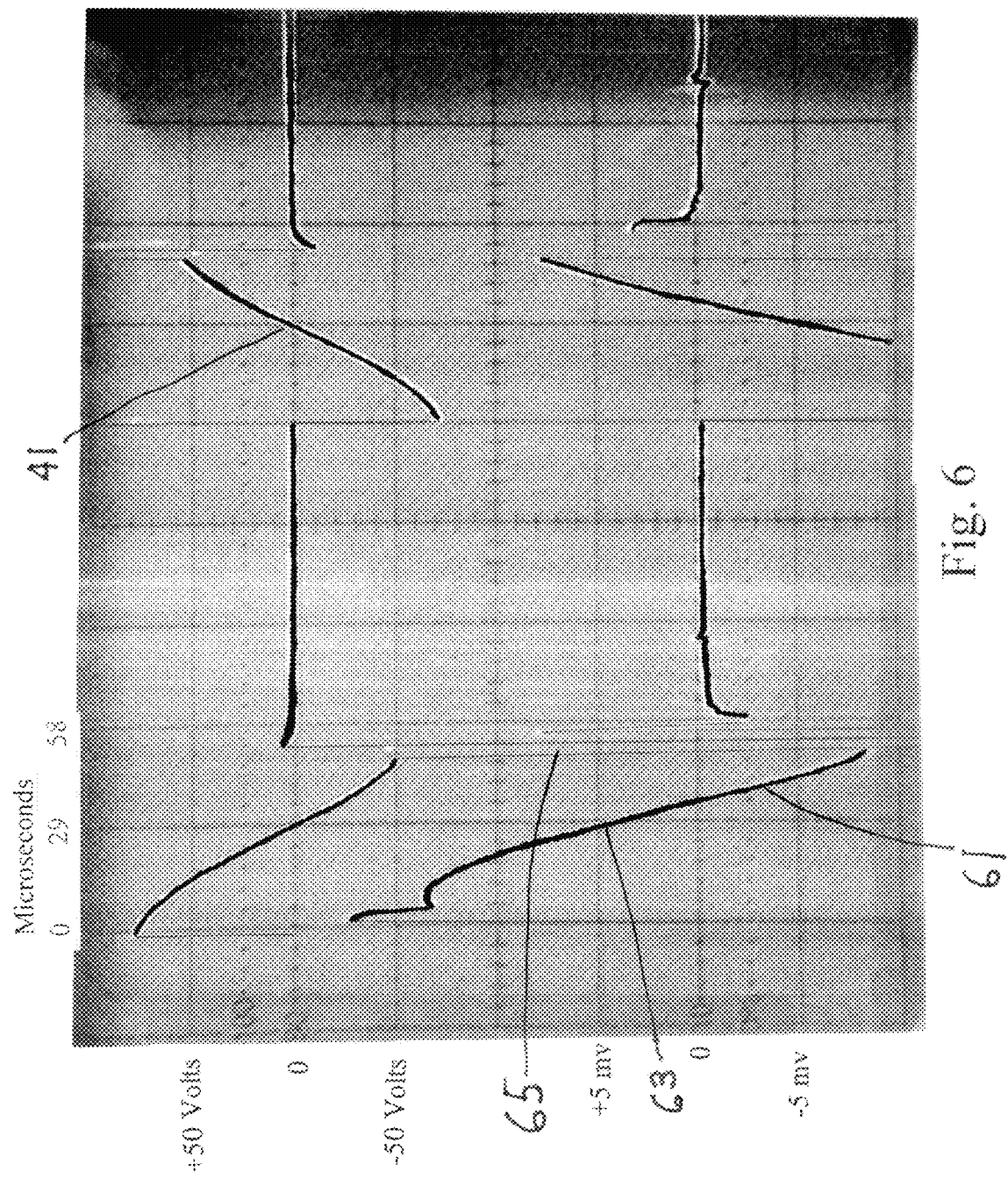
FIG. 6 shows the receive trace with ground minerals or ferrite present, enhancing the in phase transmit voltage during the active excitation time between 0 and 48 microseconds.

FIG. 6 shows the receive trace 61 with ground minerals or ferrite present, enhancing the in phase transmit voltage during the active excitation time between 0 and 48 microseconds. Note that the receive trace 51 pivots 63 about the same point at the transmit zero voltage as it did before with no ground present, indicating the approximate sampling summation point for ground nulling. Finely divided ferrite, with no electrical conduction gives an instantaneous response, whereas real ground has some additional remanence, skewing the zero response slightly. Then there is a large flyback 65 transient for a few microseconds after transmit excitation, and then the receive trace settles back to near zero after 60 microseconds, where the first pulse receive sample would be taken and is identical at that point to the residual sample with no ground or ferrite. Adjustment of ground nulling during excitation is actually accomplished by having two samples, one before and one after the expected ground nulling range and they are summed in a variable ratio by potentiometer or electronic means to get the precise ground nulling, In real ground, there is a smaller viscous magnetic remanence component that takes energy during the current increase of the transmit wave and then gives it back after the excitation, similar to an eddy current target, except the charge and discharge time constants of the remanence are not equal.

It is this decaying remanent component that occurs during the pulse induction Receive data time that adds to the desired target object, making target identification in the pulse induction time difficult. Because of the induction balance signal that can be moved before and after the actual ferrite ground phase zero, it can be slightly skewed from zero in the direction that can be added to the pulse induction data and effectively cancel the remanent signal from the target time, making accurate target pulse induction identification possible.

Figure 7:
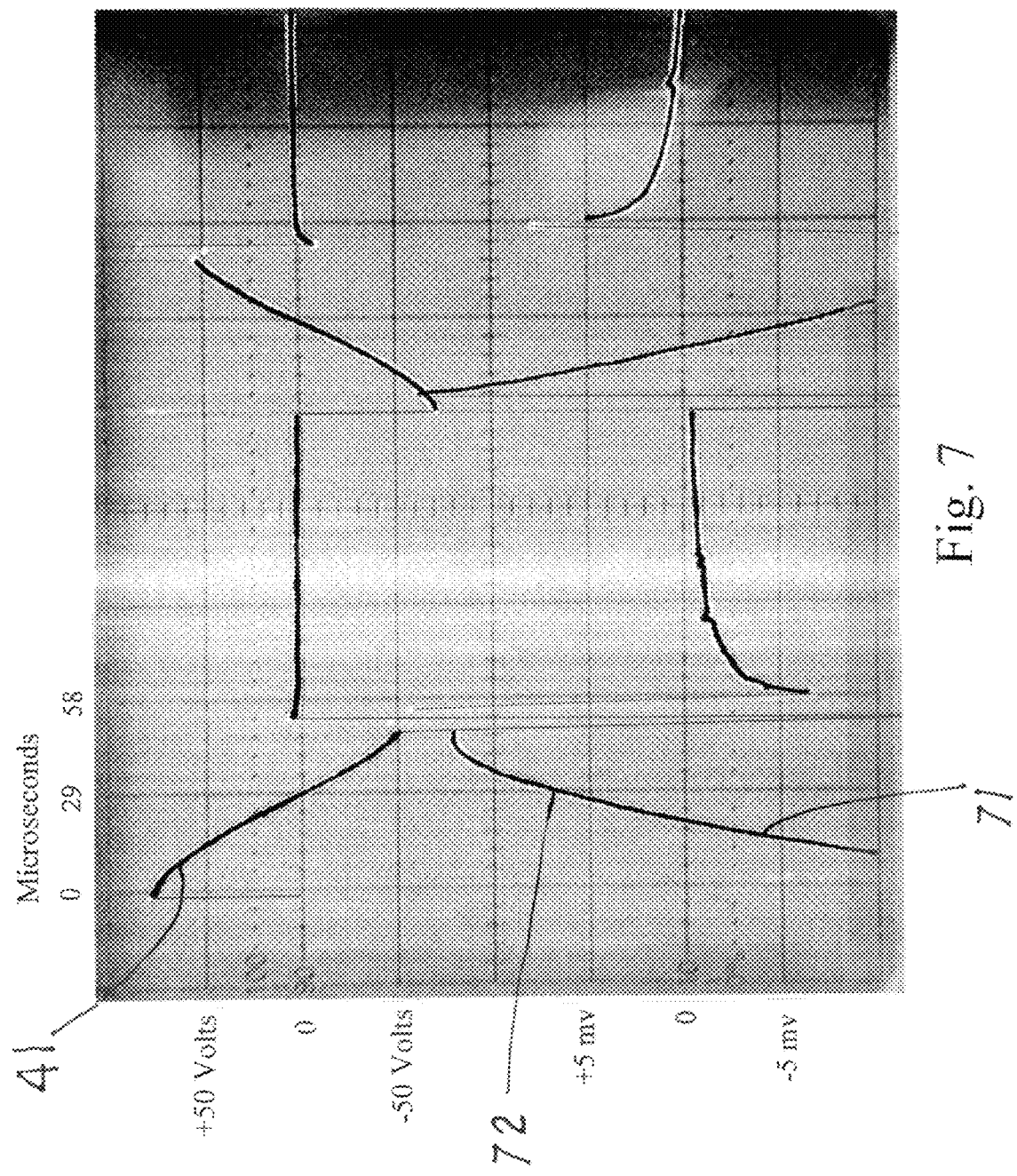
FIG. 7 shows the receive trace with a target signal added to the residual and it is of opposite phase during transmit excitation since it is an eddy current target, absorbing energy from the Transmit field.

FIG. 7 shows the receive trace 71 with a target signal 72 added to the residual. The target signal is of opposite phase during Transmit excitation, since the target signal is an eddy current target, absorbing energy from the Transmit field. Because the eddy current target object has an effective time constant for charging the eddy current field, it is still absorbing energy when the Transmit voltage passes through zero voltage, where the current peak is produced, providing a target response at that instant if there is a sample at that point, and there is, effectively nulling out the ground/ferrite response. After excitation and transient settling, the Receive trace decays from a negative potential back to zero, according to the discharge time constant of the eddy current target object and in phase with the last transmitted phase, since the target object eddy current is giving back energy it took from the last negative excitation voltage and current as illustrated in FIG. 2.

Receive samples are described here as specific points in time. Practically, they are approximately 4 microsecond wide windows, centered about the specific desired sample point.

Figure 8:
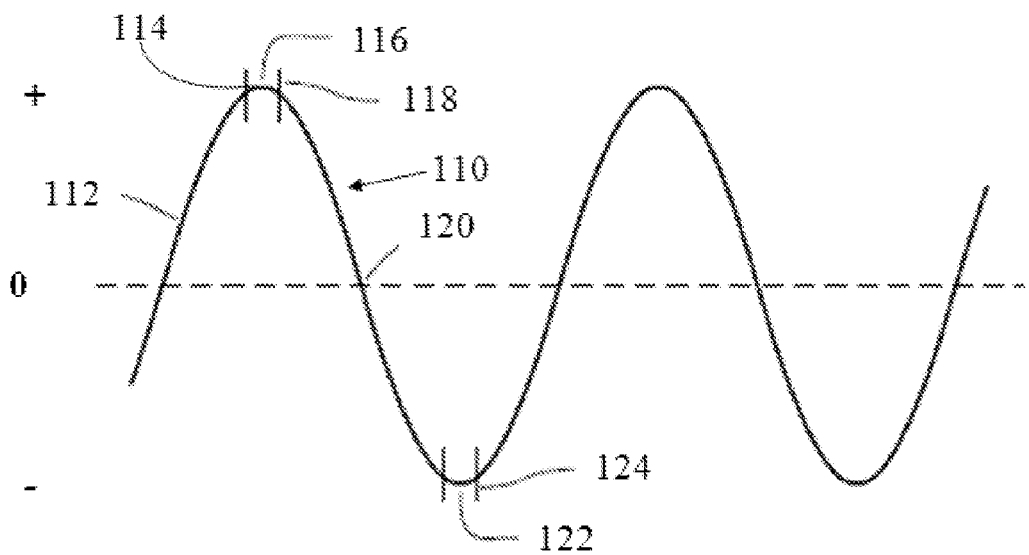
FIG. 8 shows a simple, single frequency IB wave of voltage and current.

FIG. 8 shows a simple, single frequency IB wave of voltage and current. The simple sine wave of current rises 112 and through a transmitting coil induces current in ferrite in the ground. At a position of no current change 114 at the top 116 of sine wave 110, a positive ground balance detection window 118 allows detection of the ground current through a receive coil. The current is bipolar and falls through zero 120. At the bottom 122 of the sine wave 110 when current reverses and there again is zero current change a brief negative ground balance window 124 is available for measuring induced ground current sensed through the receive coil.

Since the ferrite in the ground is of a soft magnetic character it holds no charge. At the zero current change detection windows 118, 124 the current detected in the receive coil is the current from field decay in other minerals, coins and desirable targets within the ground.

Figure 9:
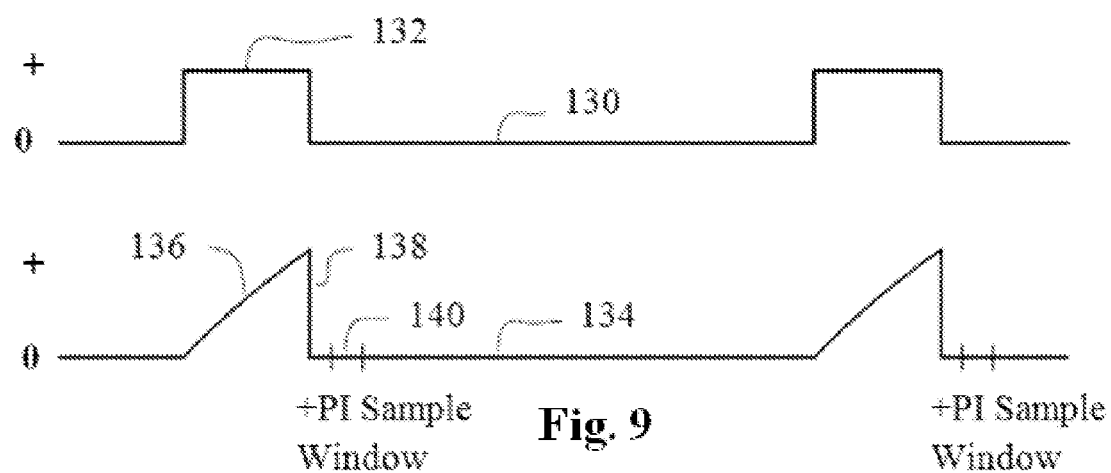
FIG. 9 shows a simple, monopolarity pulse wave of voltage and current.

FIG. 9 shows simple monopolarity pulse waves of voltage and current. The pulse voltage square wave 130 is created by a simple on-off electronic switch producing voltage pulses 132. The current wave 134 in the transmitting coil has a rising current 136 which trails the voltage. When the voltage pulse is switched off the current immediately and sharply drops 138. Right after the current drops a positive pulse induction window 140 exists in which the receive coil picks up current induced from the decay of the fields induced in the other minerals, coins, and desirable targets within the ground.

Figure 10:
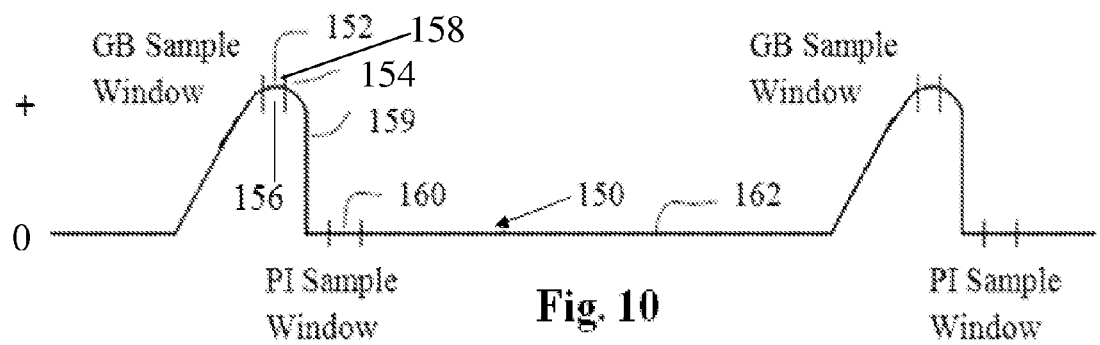
FIG. 10 shows a PI current wave, with a peak rounded off for a GB sample before it crashes to zero for the PI sample.

FIG. 10 shows a PI current wave 150, with a peak 152 rounded off 154 for a ground balance GB sample before the current wave 150 crashes to zero for the PI sample. A voltage pulse is gradually decreased creating a rounding 154 of the current peak 152 and creating a time of zero current change 156, which opens a positive ground balance detection window 158. Since ferrite in the ground is devoid of any field upon the zero current change 156, the induction current in the receive coil is a result of the decay of the field retention in the other minerals, coins, and desirable targets within the ground.

The current sharply drops 159 in the transmit coil when the voltage pulse is terminated. As a result a pulse induction sample window 160 opens in which induction current in the receive coil exists because of slower field decay in the other minerals, coins, and desirable targets within the ground. The relatively long quiescent period 162 between the shaped current forms provides complete decay of the residual currents formed by the pulses from the transmit coil.

Figure 11:
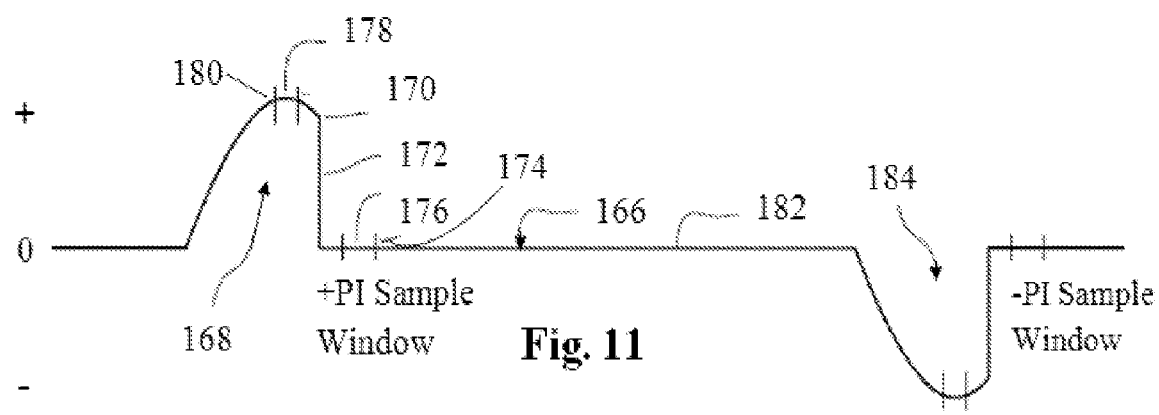
FIG. 11 shows a half sine, IB current wave, shortened up for a PI crash to five both GB and PI samples.

FIG. 11 shows a bipolar half sine, IB current wave 166, shortened 170 for a PI crash 172 to provide both GB and PI samples. The pulses from the transmit coil in the bipolar current 166 in FIG. 11 the voltage pulse induced current are shaped in partial half sine waves 168, which are shortened 170 to produce a good pulse induced crash 172 to permit a quicker window 174 for a pulse induced sample 176. The top 178 of the half sine wave 168 is rounded, which provides a period of no current change as a window 180 for a ground balance sample. After a relatively long quiescent period 182 following the pulse induction window 174, which allows all of the residual transmit coil induced current to dissipate, a negative voltage pulse creates a negative partial half sine wave current shape 184 similar in shape to the positive half sine wave.

Figure 12:
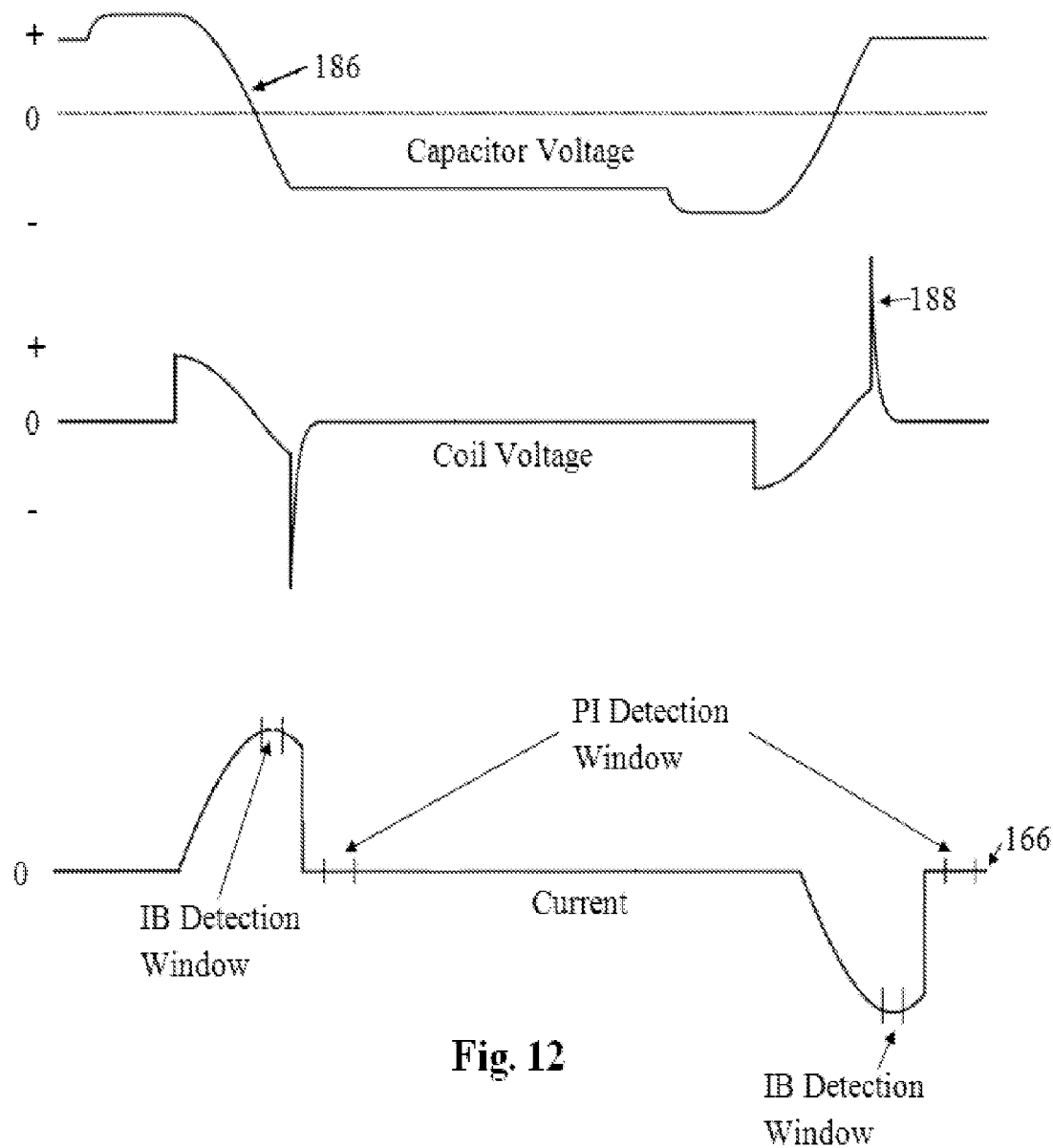
FIG. 12 shows diagrams of capacitor voltage, induction coil voltage, and current with IB detection windows and PI detection windows

FIG. 12 shows diagrams of capacitor voltage, induction coil voltage, and current with IB detection windows and PI detection windows. The capacitor voltage 186 is delivered to the transmit coil. The coil voltage 188 produces the desired bipolar current wave form 166 shown in FIG. 11.

The new metal detector uses a truncated half sine of current energizing a transmit coil past the current peak. The current is then truncated and switched off abruptly. A ground balanced receive sample is taken in the vicinity of the sine current peak. A cessation of the inducing current causes an abrupt end of the magnetizing current and field. A second receive sample is taken after the transmit current ceases to detect an eddy current from a target object. The remanent portion of the ground composite signal is further detected in the induction balance half sine peak. Where the permeability component is zero, the remanent component may be added or subtracted from the pulse data at a specific sampling point or points to characterize the eddy current of the target object in both induction balance modes and pulse decaying modes by comparing the data from both.

A charged capacitor causes the transmit current to flow initially as a half sine current wave, followed by an abrupt cessation of current as the capacitor is switched off.

Multiple receive samples are taken after the current ceases, and remanent components are fractionally subtracted from each sample.

At least two samples are taken of the current sine in the vicinity of the peak. One sample nulls out the permeability signal only, and the other sample nulls out the composite ground containing both permeability and remanence signals. The permeability nulled signal contains a remanent component to be subtracted from pulse data that also contains remanent signal. The composite ground nulled signal provides a second channel of eddy current target data to be compared with the after-pulse decaying data minus the remanent component subtracted therefrom. While remanent components of ground are subtracted, the desired target signals are additive.

The new metal detector employs an induction balance signal sample that nulls out the ground permeability signal, leaving the remanent ground signal plus target eddy signals. Multiple pulse type samples taken following truncation of the half sine exciting current include remanent ground signals plus target eddy signals of the same phase but differing amplitudes. Subtracting the induction balance derived remanent signal from the pulse type derived remanent signal totally removes the ground complex and the desired target signals are added to provide the target signal.

Multiple pulse derived and remanence removed signals are compared in amplitude to provide identification of the target signals without the need for ground motion filtering when both remanent and permeability components of the ground have been removed.

A half sine current provides classical induction balance mode response. Instantly switching to a truncation of the current before the end of the half sine switches to a classical pulse mode with pulse mode response producing a hybrid energizing field. The combined results provide for ground cancellation of both permeability and remanent components. The data is combined from both modes cancelling all ground mineral components, while adding desired eddy current target signal components that cannot be achieved by either induction balance or pulse mode metal detectors independently.

The metal detector with energizing field is derived by discharging a charged capacitor into a field inducing transmit coil providing a half sine of current during the inductive capacitive resonance. The capacitor is switched off from the inductive coil. During the last quarter of the half sine current flows back into the capacitor. Eddy current target effects can be viewed during both active excitation and non-excitation following the switching off of the capacitor current.

The resonating capacitor is switched off between 91 and 179 degrees of the half sine, preferentially between 135 and 160 degrees and typically at 150 degrees. The current is diminished to 50% of the peak at 90 degrees. The capacitor voltage recovery is 86.6% minus small coil resistance losses.

Switching of the capacitor/inductor charging, discharging and current control is accomplished by back-to-back field effect transistors. The field effect transistor switches are driven by isolating gate drive transformers from the logic timing source.

Consecutive truncated half sines of current are of opposite polarity as efficiency is enhanced by the bipolar resonance proceeding past the peak of current, providing bipolar waves allowing for earth magnetic field cancellation with as little as one sample of both polarities during the pulse mode sampling time following the truncated half sines of current.

Normal pulse mode continuous critical damping is removed during the resonant portion of the current wave for increased efficiency during the resonant portion of the inducing current wave.

Inductive flybacks at cessation of current are coupled to transformers that feedback a lower voltage and higher current to the power supplies for increased efficiency.

Adjusting the ratio of induction balance to pulse induction data provides pure induction balance performance, pure pulse induction performance and any ratio of both for effects unobtainable with either technology alone.

Fixed ratios allow for automatic control of ground nulling and ground cancellation in the audible response and in the target identification calculation and resultant.

Additional receive sampling offset from the ground null phase and high pass filtering (motion filtering) is applied to two or more induction balance receive sample signals to provide target identification as a stand-alone induction balance detector.

High pass filtering eliminates DC drift.

The new metal detector has adjustable frequency high pass filtering.

With duty cycle switching of passive components in the filtering, all channels track accurately as the filter response time is changed on all channels of data equally.

Duty cycle frequency filtering uses a frequency that is higher than the basic data channel signal rates of change. Alternatively, duty cycle frequency filtering using a frequency that is at or below the audio frequency target indication presented to the user.

While the invention has been described with reference to specific embodiments, modifications and variations of the invention may be constructed without departing from the scope of the invention, which is defined in the following claims.

I claim:

1. A method comprising metal detecting by using a truncated half sine of magnetizing current, energizing a transmit coil past the current peak, then truncating and abruptly switching off the current, taking a first ground balanced receive sample in a vicinity of the sine current peak, followed by a ceasing of the inducing current and causing an abrupt end of the magnetizing current and field, followed after the transmit current ceases by taking a second receive sample of eddy current from a detectable target object, and detecting a remanent component signal of a ground composite signal during the induction balance half sine peak, wherein a permeability component is zero and adding or subtracting the remanent component from pulse data at a specific sampling point or points to characterize the eddy current from the target object in both induction balance modes and pulse decaying modes by comparing the data from both of the modes.

2. The method of claim 1, wherein a charged capacitor causes the transmit coil current to flow initially as a half sine current wave, followed by causing the abrupt cessation of current as the capacitor is switched off.

3. The method of claim 1, further comprising taking multiple target receive samples after the current ceases and fractionally subtracting remanent components from each sample.

4. The method as in claim 1, further comprising taking at least two ground receive samples in the vicinity of the peak of the current sine, with one ground receive sample nulling out the permeability component only and the other first sample nulling out the composite ground containing both permeability and remanence signals, the permeability nulled signal containing a remanent component to be subtracted from the pulse data also containing remanent signal, and the composite ground nulled signal providing a target channel of eddy current target data to be compared with the after pulse decaying data minus the remanent component subtracted therefrom, subtracting remanent components of the ground samples and adding the desired target signals are additive.

5. The method as in claim 4, wherein the first permeability nulling sample is split into two first samples, one just prior to the zero permeability response time and one just after the zero permeability response time, such that the two first samples have approximately the same amplitude from the permeability signal but the two first samples are of opposite phase, and when both are changing in opposite phase directions, then the permeability or ground signal is considered to be active and a calculation of their respective amplitudes is made and the ratio determined and used to add the two signals together resulting in a nulled permeability or ground response and low pass filtering is applied after this determination which provides fast nulling of the ground with response time determined by the low pass filtering and not the actual rate of ground change.

6. The metal detecting method as in claim 5, wherein said method has an additional detection channel from the pulse responses after the transmitting current ceases, wherein the pulse response normally responds to not only conductive targets, but also remanent iron mineralization that persists after the permeability response is gone and a portion of one of the permeability responses during the active half sine is subtracted from the pulse response to null out the remanent component.

7. A metal detecting method comprising providing a half sine exciting current, receiving time spaced induction balance signal samples, nulling out a ground permeability signal, leaving a remanent ground signal, truncating the half sine exciting current, receiving target signal samples and multiple pulse type samples with the remanent ground signal plus target signals of the sample phase but having different amplitudes of the target signals, and subtracting the induction balanced derived remanent ground signal from the pulse type derived signal, wherein the ground complex is totally removed, and adding the desired target signals to provide a target indication.

8. The metal detector method as in claim 5, wherein multiple pulse derived and remanence removed signals are compared in amplitude to provide identification of the target signals without the need for ground motion filtering while both remanent and permeability components of the ground have been removed.

9. A metal detector method comprising providing an energizing field with a half sine of current, providing induction balance mode response, followed by instantly switching to a truncation of said current before an end of the half sine that switches to a pulse mode, with the pulse mode producing a hybrid energizing field, combining the responses, providing ground cancelling of both permeability and remanent components, wherein data combined from both modes cancels ground mineral components while adding desired eddy current target signal component.

10. The metal detector method of claim 9, wherein the energizing field is derived by discharging a charged capacitor into a field inductive transmit coil, thereby providing a half sine of current during the inducing capacitive resonance wherein the capacitor is switched off from the inductive coil during a last quarter of the half sine while current is flowing from the inductive coil back into the capacitor, such that eddy current target effects can be viewed during both active excitation and non-excitation following the switching off of the capacitor.

11. The metal detector method as in claim 10, wherein the capacitor is switched off between 91 and 179 degrees of the half sine, preferentially between 135 and 160 degrees and preferably at 150, degrees wherein the current is diminished to 50% of the peak at 90 degrees while the capacitor voltage recovery is 86.6% minus small coil resistance losses.

12. The metal detector method as in claim 11, wherein switching of the capacitor/inductor charging, discharging and current control is accomplished by back-to-back field effect transistors.

13. The metal detector method as in claim 12, wherein consecutive truncated half sines of current have opposite polarity, and efficiency is enhanced by bipolar resonance proceeding past the peak of current providing bipolar waves allowing for earth magnetic field cancellation with as little as one sample of both polarities during the pulse mode sampling time following the truncated half sines of current.

14. The metal detector method as in claim 12, wherein the field effect transistor switches are driven by isolating gate drive transformers from a logic timing source.

15. The metal detector method as in claim 11, wherein critical damping is applied when the capacitor is switched off as the mode is changed from induction balance to pulse technology.

16. The metal detector method as in claim 11, wherein pulse mode continuous critical damping is removed during a resonant portion of the current wave for increased efficiency during the resonant portion of the inducing current wave.

17. The metal detector method as in claim 11, wherein inductive flybacks at cessation of current are coupled to transformers that feedback a lower voltage and higher current to the power supplies for increased efficiency.

18. The metal detector method as in claim 11, further comprising adjusting a ratio of induction balance to pulse induction data, providing pure induction balance performance, pure pulse induction performance or any ratio of both.

19. The metal detector method as in claim 18, with fixed ratios allowing for automatic control of ground nulling and ground cancellation in the audible response or in target identification calculation and resultant.

20. A metal detector as in claim 19, with additional receive sampling offset from the ground null phase and high pass filtering (motion filtering) is applied to two or more induction balance receive sample signals to provide target identification as a stand-alone induction balance detector.

21. The method of claim 1, further comprising providing high pass filtering to eliminate DC drift.

22. The method of claim 21, further comprising providing adjustable frequency high pass filtering.

23. The method of claim 22, further comprising providing duty cycle switching of passive components in the filtering, such that all channels track accurately as the filter response time is changed on all channels of data equally.

24. The method of claim 23, further comprising providing duty cycle frequency filtering using a frequency that is higher than the basic data channel signal rates of change.

25. The method of claim 24, further comprising duty cycle frequency filtering using a frequency that is at or below the audio frequency target indication presented to the user.

26. The method of claim 1, further comprising providing multiple frequency truncated half sine current energizing the transmit coil, thereby providing discrimination and target identification by comparing ground balanced receive signals from two or more frequencies.

* * * * *